April 3, 1956

K. E. ANDREWS 2,740,832

COLOR CORRECTION SYSTEMS

Filed Dec. 18, 1952

INVENTOR.
Kenneth E. Andrews
BY Morris A. Rabkin
ATTORNEY

United States Patent Office 2,740,832

Patented Apr. 3, 1956

2,740,832

COLOR CORRECTION SYSTEMS

Kenneth E. Andrews, Barrington, N. J., assignor to Radio Corporation of America, a corporation of Delaware Application December 18, 1952, Serial No. 326,750

9 Claims. (Cl. 178—5.4)

This invention relates to systems for making color corrected separation records from uncorrected color separation records and more particularly to an improvement in the optical scanning systems employed therein.

In an article in the "Journal of the Optical Society of America," volume 38, Number 4, April 1948, entitled "Color Correction in Color Printing" by Arthur C. Hardy and F. L. Wurzburg, Jr., there is described a system for obtaining color corrected negatives from color separation positives. Color separation negatives are made by photographing a subject through a red filter, a green filter, and a blue filter. These three negatives are then used to provide three photographic positives which are monochrome representations of the tristimulus values of the original subject. The color separation negatives cannot be directly used for making printing plates for truly reproducing the original subject without some corrections being made. The color characteristics of the printing inks to be used as well as the color of the paper on which the print is to be made are some of the factors for which allowances must be made. The article above mentioned describes a system wherein the three color separation positives are scanned simultaneously to provide three electrical signals. These three signals are then applied to a computer which computes the required corrections and then provides, as an output, three corrected electrical signals. Each of these signals in turn is used to control the intensity of a light to which sensitized photographic plate is exposed. The mechanism in Figure 1 of the article shows that the three separation positives are scanned simultaneously while a sensitized photographic plate is exposed to the controlled light. A line by line scan is used and this complete scan is repeated three times while exposing three separate photographic plates and is done four times where a four color process is desired. Of course, each time a scan is made a different corrected output signal controls the exposure light. The resultant photographic plates are color corrected and may be used for making printing plates.

The scanning and exposing system used with this color correction apparatus is a mechanical one. To eliminate the limitations and disadvantages of a mechanical system an electronic one has been proposed. A cathode ray tube providing an intense spot of light which is movable and is commonly known as a "flying spot scanner" is used as a scanning light source and a second cathode ray tube, which has the intensity of its electron beam controlled by one of the output signals from the color correction computer, is used as the exposure light source. The scanner cathode ray tube provides a spot of light on its screen which, by means of a beam splitting arrangement, is split into three parts. Each of these three light beams is focussed on a corresponding spot on each of the three separation positives. The light transmitted through each positive is converted into an electrical signal by a photocell and these electrical signals are applied to the color correction computer.

The scanning cathode ray beam and the exposure cathode ray beam are deflected together so that, while the three color separation positives are being scanned, a color corrected photographic plate is being exposed.

It was found that the electronic exposing and scanning system posed some very exacting requirements on the cathode ray tubes. In one instance, the resolution required for an acceptable picture is at least 2,000 lines overall, with at least 5 million elements in a 4 x 5 picture. Thus, a picture element is of the order of 0.002 inch, which is the size of the scanning light spot. For practical purposes, the cathode ray tube must provide a point source of light.

The optical beam splitter of the aforementioned color correction system utilizes partially reflecting and transmitting mirrors. It was found that unwanted reflections or "ghost" images of the scanning light spot are introduced by the front and rear surfaces of these mirrors. The ghost images of the scanning light spot on the color separation positives are displaced from the true images. This means that the ghost image light spots are directed through areas on the positives other than the areas being scanned, and these ghost images are not uniform for the three positives. If, for example, the area of the positive being scanned is relatively dark, transmitting a small amount of light, and the ghost images fall on an adjacent area transmitting proportionally larger amounts of light, significant non-uniform errors are contained in the quantity of light received by each photocell. The electrical signals generated by the photocells are, therefore, not truly representative of the areas being scanned, and the computer operates with inaccurate data. The color-corrected negatives which are produced from the computer outputs are not properly representative of the original photograph, and the printing plates made from these negatives produce a picture having obvious inaccuracies and distortions. In view of the high standards of the graphical arts, inaccuraces such as these cannot be tolerated.

The beam splitter made up of partially reflecting and transmitting mirrors has other undesirable features. The color separation positives are mounted in different transverse planes. Thus, they have different orientations, so that proper mounting of the positives, and the operations by a technician in using the apparatus become complicated. The three light paths produced by the mirrors have a common imaging lens. Therefore, the light directed to each color separation positive is only about a third of the light transmitted by the imaging lens. Furthermore, the three light paths are interrelated, so that compensation or adjustment in but one of the light paths is difficult to accomplish. Also, the effects in the three divergent light paths of temperature or vibration variations are not likely to be uniform, so that compensation therefor is extremely complex.

Accordingly, an object of this invention is to provide an optical light imaging device for an electronic scanning system which is simple and highly accurate.

Another object of this invention is to provide an improved optical beam imaging device and scanning system which is accurate and simple in construction and operation.

Still another object of this invention is to provide a novel light imaging device and scanning system for a color correction system of the type described which is accurate, relatively simple to maintain, and which requires a minimum of compensation.

These and other objects of this invention are achieved by employing, in a color correction system of the type described, a separate imaging lens for each one of the color separation positives. A symmetrical lens cluster having a flat field is used for each imaging lens. The color separation positives are mounted in substantially the same plane, and have the same orientation. Each symmetrical lens cluster is located substantially midway between the associated positive and the origin of the scanning light spot, so that the symmetrical lenses operate at unit magnification, and are thus automatically corrected for distortion and are free from coma and transverse chromatic aberration.

The novel features of this invention both as to its organization and method of operation will be best understood from the following description when read in connection with the accompanying drawing in which.

Figure 1:
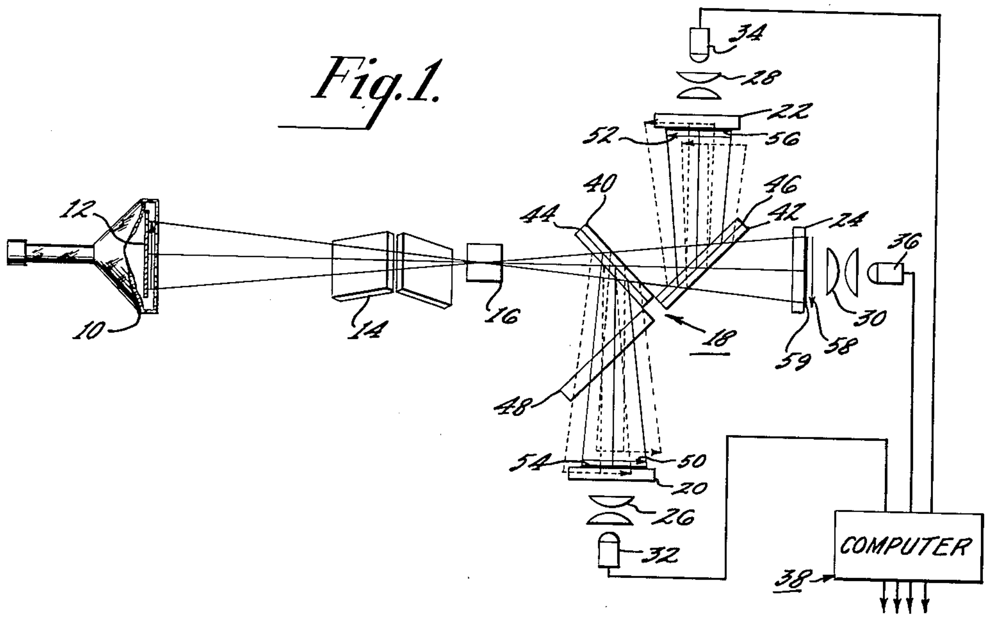
Figure 1 is a schematic diagram of a prior art color correction system.

Referring now to Figure 1, there may be seen a schematic drawing of a color correction system which is known at present. A flying spot tube 10 providing a spot of light having a high lumen content is employed to scan three transparencies which are color separation positives. The flying spot tube is of the type described in an article in "Electronics," June, 1948, page 124, entitled "The Flying Spot Video Generator." The optical paths of the scanning spot from the screen 12 of the flying spot tube or kinescope is through a set of astigmatism compensating plates 14, an imaging lens 16 and then through a mirror beam splitter 18 to the color separation positive transparencies 20, 22, 24, hereinafter called the first, second and third respectively. The positives are oriented so that the three light beams produced by the beam splitter 18 strike corresponding spots on each positive simultaneously. The light passing through each color separation positive is concentrated by a condenser lens 26, 28, 30 and directed on to an associated phototube 32, 34, 36. The phototubes change the light variations into electrical signal variations. These three sets of electrical signals are applied to a color correction computer 38 which may be of the type described in U. S. Patent No. 2,434,561 to Hardy et al. The computer computes the corrections required for the signals in order that a proper color separation may be produced. The computer provides four outputs corresponding to a cyan, magenta, yellow and black color corrected electrical signal.

The beam splitter 18 is made up of two optical sandwiches 40, 42, which have a partially reflecting surface 44, 46 at the center of each sandwich, and a third element, an optically flat, compensating plate 48. These partially reflecting surfaces 44, 46 provide the desired images 50, 52 of the light spot on the first and second color separation positives 20, 22 as shown by unbroken lines in Figure 1. In addition to the reflections from the partially reflecting surfaces 44, 46 there are unwanted reflections introduced from the front and rear surfaces of the two optical sandwiches 40, 42. The unwanted reflections are shown by broken lines in Figure 1. These unwanted reflections produce ghost images of the scanning spot in planes in front of and behind the emulsion planes 54, 56 of the first and second color separation positives 20, 22. As a result, distinct geometrical images of three light spots, one true and the other two spurious, fall on the first and second separation positives. Thus, the light transmitted to the phototubes 32, 34 associated with the first and second color positives includes that introduced by the ghost images. The ghost image light is transmitted through different areas of the color positives which are displaced from the areas to which the true image is directed. Accordingly, the light received by the phototubes 32, 34 is not precisely limited to that through the desired area to be scanned, and errors, therefore, are contained in the electrical signals produced by the first and second phototubes. As a result, the computer operates with erroneous data and the color corrected negatives which are produced from the computer outputs are inaccurate. The color corrected negative, in fact, is formed with ghost images corresponding to the ghost images of the scanning light spot. The printed picture that is based on such color corrected negatives also has a ghost image pattern and cannot meet the high standards of the graphic arts.

The quantity of light that is transmitted and reflected by the partially reflecting and transmitting mirrors in the beam splitter varies with the angle of incidence of the beam of light. Therefore, in the beam splitting system shown in Figure 1, the quantity of light that forms the true image of the scanning spot and is reflected and transmitted by the beam splitter is not uniform over the entire field. Thus, the signals received by the computer are not accurate, and it computes false color corrections.

Another disadvantage of this system is that minute vibrations of the optical sandwiches 40, 42 are significantly magnified in the reflecting action of the partially reflecting surfaces 44, 46. Any vibration of these sandwiches which produces a rotation of only several seconds causes a relatively large displacement of the light spot image from the area of the color separation being scanned. This impairs both rendition of correct color and resolution of fine detail. The fabrication of a mirror support to hold the mirrors sufficiently stationary is extremely difficult.

Other undesirable features of this system should be noted. The astigmatism compensating plates 14 are necessary to compensate for the astigmatism introduced by the mirrors. Because a single imaging lens 16 is used, the available light applied to each color separation positive is only about a third of that transmitted through the imaging lens. Thus, the scanning light supplied by the kinescope is not fully utilized. The color separation positives have different orientations so that special care has to be used in order that they be set up properly. Furthermore, there is lateral inversion of the images 50, 52 on the first and second positives due to the reflecting surfaces 44, 46, while the image 58 on the third positive is not inverted. Therefore, the third color separation positive 24 has to be positioned with the emulsion side 59 away from the optical system in order that the scanning beam strike corresponding areas of each color separation positive. As a result, the optical paths of the scanning beams are not uniform. While theoretically an extra mirror may be used in order to invert the beam to the third separation positive, space limitations make this impracticable.

Figure 2:
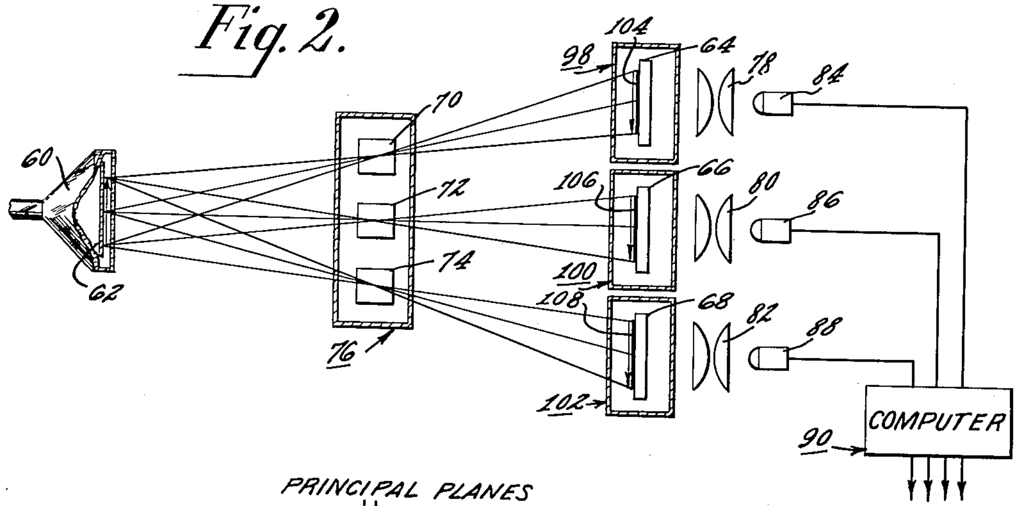
Figure 2 is a schematic diagram of a color correction system having therein an embodiment of this invention.

The improved color correction system embodying this invention is shown in Figure 2. A flying spot tube 60 is again employed. A separate optical path is provided for directing the scanning spot from the screen 62 of the tube to corresponding areas of each of three color separation positive transparencies 64, 66, 68. Each optical path is made up of a separate one of a plurality of imaging lens clusters 70, 72, 74 mounted in a frame 76 approximately midway between the screen 62 of the flying spot tube 60 and the plane of the associated color separation positive. The light through the color separation positive 64, 66, 68 is concentrated by condenser lenses 78, 80, 82 onto phototubes 84, 86, 88, and the outputs from these phototubes are applied to a color correction computer 90 in the manner described above. The invention is not limited in its application to transparent color separations, nor to positives, but may be applied to any appropriate photographic records.

Figure 3:
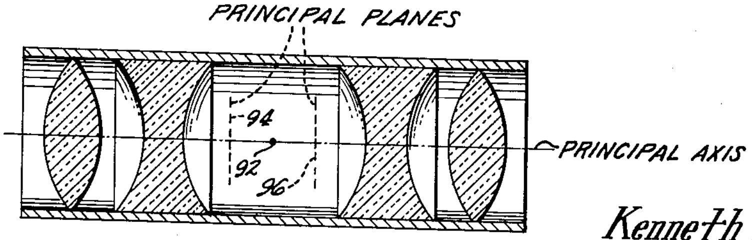
Figure 3 is a schematic diagram of a symmetrical lens cluster employed in the embodiment of this invention.

The imaging lens clusters 70, 72, 74 are substantially identical, made up of plus and minus lenses, and are of the symmetrical type, as shown in Figure 3. A symmetrical lens is one in which the optical paths from the center 92, or from the object and image principal planes 94, 96, are the same, going in opposite directions to the object and image. When operated under a condition of unit magnification, a symmetrical lens is automatically corrected for distortion and is free from coma and transverse chromatic aberration. Symmetrical lenses having a flat field are used, in order that they may be positioned in parallel planes, and the color separation positives may also be positioned in parallel planes.

The lens clusters 70, 72, 74 are adjustably mounted in the same frame 76, and appropriate adjusting means (not shown), such as a rack and pinion or the like, are provided in order that they may be adjusted axially along their optical paths. The color separation positives 64, 66, 68 are mounted in supporting frames 98, 100, 102 with the emulsion side 104, 106, 108 of each positive facing the associated imaging lens. A three-point register mechanism (not shown) is used in each supporting frame to position the color separation positive in a plane parallel to the principal planes of the associated imaging lens. Additional adjusting means may be provided in each supporting frame 98, 100, 102 so that the color separation positives may be adjusted transversely of the optical paths. Appropriate three-point register mechanisms and supporting frame adjusting devices are well known in the art, and therefore, are not described here.

Normally, the supporting frames 98, 100, 102 for the color separation records provide a fixed position for these color separations. The color separation positives are oriented in the same direction and mounted in substantially the same plane. The imaging lenses 70, 72, 74 are mounted in parallel planes in their supporting frame 76 and may be adjusted axially in their frame 76 to position them precisely for unit magnification of the scanning spot. Under such conditions, the distance from the screen 62 of the flying spot tube 60 to the object principal plane 94 of each imaging lens is equal to the distance from the image principal plane 96 to the plane of the associated color separation positive. By using flat field symmetrical lenses, the planes of the color separation positives are parallel and substantially coplanar. Except for small variations due to small differences in focal length of commercial lenses, corresponding planes of the imaging lenses are also coplanar.

Due to the limitations of commercial photography, the color separation positives may not always be identical in size. Ordinarily, this would mean that the scanning spot is not directed to precisely the same areas in each one of the color separation positives. For example, if one of the positives is slightly larger than the other two, the light spot would have to sweep across a longer distance on the one compared to the others. Compensation for this defect may be provided by adjusting the axial position of any one of the imaging lenses to change the magnification of the raster of the flying spot tube 60 for the associated color separation positive independently of the other optical paths. The adjustment of the lens will be a very small order so that there is no sacrifice of sharp focus. For an adjustment of the lens of 0.02 inch, the enlargement of the scanning spot due to defocusing is about 0.00002 inch, which is negligible since it is only $\frac{1}{100}$ of the scanning spot of 0.002 inch. Furthermore, the movement of the lens necessary to accomplish the change of magnification does not materially introduce distortion as it departs from a condition of precisely unit magnification. In order to adjust for variations in size of one of the positives in the system shown in Figure 1, the positive has to be moved since there is only a single imaging lens. For the same adjustment of 0.02 inch, the spot enlargement due to defocusing is 0.001 inch which is ½ of the scanning spot size. This would materially affect the quality of the picture produced.

With the simplified lens imaging arrangement embodying this invention, the effects of temperature variations and vibration tend to be uniform. Thus, many of the problems introduced by such variations may be avoided and the need for compensation is reduced or obviated. Furthermore, where such compensation is necessary, each of the paths are independent, substantially identical and oriented in the same direction so that compensation may be more easily accomplished. In addition, with this simplified arrangement, mechanical design of covers and the like for sealing off the optical system from dust in the atmosphere is relatively simple.

Accordingly, there has been described herein a system for obtaining accurate, registerable color correction negatives from color separation transparencies. The apparatus described is simple and reliable.

What is claimed is:

1. In a system for obtaining color corrected records from a plurality of photographic color separations, the combination of means for producing a light spot to successively scan an area, means for supporting a plurality of said color separations in parallel planes, and a light imaging lens system for simultaneously directing said light spot to corresponding areas of said color separations, comprising a separate optical of said paths for said light spot to each of said color separations each path being substantially the same and including a separate symmetrical imaging lens cluster having a substantially flat optical field, and means for supporting said symmetrical lens clusters with the principal planes thereof parallel.

2. The combination as recited in claim 1 wherein the object and image principal planes respectively of each of said symmetrical lens clusters are substantially equidistant from the origin of said light spot and the plane of the associated color separation.

3. The combination as recited in claim 2 wherein the planes of said color separations are substantially coplanar, and the corresponding principal planes of said symmetrical lens clusters are substantially coplanar.

4. In a system for obtaining color corrected records from a plurality of color separation transparencies, a cathode ray tube having a screen producing a scanning light spot, a light imaging lens system including first, second and third symmetrical imaging lens clusters for simultaneously directing said light spot to corresponding areas of said color separation transparencies, means for supporting a first, second and third of said color separation transparencies in substantially the same plane, and means for supporting said lens clusters with the centers thereof located in substantially the same plane midway between said plane of color separation transparencies and said cathode ray tube screen and parallel thereto, said first, second and third lens clusters providing separate optical paths for said scanning light spot to said first, second and third color separation transparencies respectively.

5. In a system for obtaining color corrected records from color separation transparencies including a cathode ray tube having a screen producing a scanning light spot, means for simultaneously directing said light spot to corresponding areas on said color separation transparencies, photoelectric means for converting the light passing through said color separation transparencies to representative electrical signals, and a color correction computer for producing color corrected signals in accordance with said representative electrical signals, the improvement therein comprising means for supporting said color separation transparencies with the planes thereof lying in the same direction, a separate optical path for said light spot to each of said color separation transparencies, each of said optical paths including an imaging lens cluster positioned optically midway between the plane of the associated color separation transparency and said cathode ray tube screen whereby a ghost-free image of said light spot is directed to said color separation transparencies.

6. In a system for obtaining color corrected records from color separation positives as recited in claim 5 wherein each of said imaging lens clusters is a symmetrical lens cluster having a flat field, corresponding principal planes of said lens clusters are substantially coplanar, and said color separation transparencies are positioned in substantially the same plane, parallel to said principal planes.

7. A color correction system of the type employing a plurality of color separations for obtaining color corrected records, said system comprising common means for simultaneously scanning corresponding areas of said color separations with a light spot, means for supporting a plurality of said color separations in parallel planes, a plurality of individual symmetrical lens systems disposed in separate optical paths between said common scanning means and different ones of said color separations, said lens systems being substantially identical and having substantially flat optical fields, and means for supporting said lens systems with the principal planes thereof disposed in parallel relation, said lens systems being individually adjustable in the direction of the respective optical paths for conforming the area of scan of said light spot to the area of the associated color separation.

8. A color correction system as recited in claim 7 wherein the object and image principal planes respectively of each of said lens systems are substantially equidistant from the origin of said light spot and the plane of the associated color separation.

9. A system for simultaneously scanning a plurality of related photographic records, said system comprising means for producing a scanning light spot, means for supporting said photographic records in planes oriented in the same direction, a plurality of symmetrical lens clusters disposed in separate optical paths between said light spot producing means and different ones of said record supporting means for simultaneously directing light from said light spot to corresponding areas of said records, said lens clusters being identical and having flat optical fields, and means for supporting said lens clusters with the principal planes thereof oriented in the same direction as said photographic record planes.

References Cited in the file of this patent

UNITED STATES PATENTS

| | | |
|---|---|---|
| 2,389,646 | Sleeper | Nov. 27, 1945 |
| 2,434,561 | Hardy | Jan. 13, 1948 |
| 2,603,706 | Sleeper | July 15, 1952 |
| 2,607,845 | Clark | Aug. 19, 1952 |
| 2,627,547 | Bedford | Feb. 3, 1953 |